United States Patent [19]

Polichnowski

[11] 4,302,432
[45] Nov. 24, 1981

[54] PREPARATION OF HYDROGEN IODIDE, LITHIUM IODIDE AND METHYL IODIDE

[75] Inventor: Stanley W. Polichnowski, Kingsport, Tenn.

[73] Assignee: Eastman Kodak Company, Rochester, N.Y.

[21] Appl. No.: 209,351

[22] Filed: Nov. 21, 1980

[51] Int. Cl.$^3$ .......................... C01B 7/13; C01D 3/12; C07C 17/22
[52] U.S. Cl. ................................ 423/487; 423/499; 570/101
[58] Field of Search ............... 423/481, 487, 499, 486; 570/247, 254, 101

[56] References Cited

U.S. PATENT DOCUMENTS

| | | | |
|---|---|---|---|
| 1,890,894 | 12/1932 | Weston | 423/487 |
| 3,049,406 | 8/1962 | Grant et al. | 423/499 |
| 3,154,382 | 10/1964 | Gerald | 423/487 |
| 3,761,579 | 9/1973 | Curtis et al. | 423/486 |
| 3,784,518 | 1/1974 | Paulik | 423/487 X |
| 3,848,065 | 11/1974 | Paulik | 423/487 |

FOREIGN PATENT DOCUMENTS 47-15456  5/1972  Japan .................................. 423/487

Primary Examiner—Earl C. Thomas
Attorney, Agent, or Firm—J. Frederick Thomsen; D. B. Reece, III

[57] ABSTRACT

Disclosed is a process for the preparation of hydrogen iodide, lithium iodide and methyl iodide by the reaction under anhydrous conditions of hydrogen and iodine in a non-alcoholic solvent using a homogeneous rhodium catalyst. Lithium iodide and/or methyl iodide are obtained by including lithium acetate and/or methyl acetate in the reaction medium.

4 Claims, No Drawings

PREPARATION OF HYDROGEN IODIDE, LITHIUM IODIDE AND METHYL IODIDE

This invention pertains to a novel process for the preparation of hydrogen iodide, lithium iodide and methyl iodide by the reaction under anhydrous conditions at elevated temperature and pressure of hydrogen and iodine ($I_2$) in a non-alcoholic, organic solvent using a homogeneous rhodium catalyst.

The use of catalyst systems comprising rhodium and an iodine compound in the preparation of acetic anhydride by the carbonylation of methyl acetate has been reported in the patent literature. See, for example, Belgian Pat. No. 819,455, British Published Patent Application Ser. No. 2,013,184, Japanese Published Patent Applications Nos. 75-47921 and 75-47922 and U.S. Pat. Nos. 3,927,078 and 4,046,807. Those publications also disclose that the reaction rate can be increased if the catalyst system contains a promoter such as a lithium compound.

The production of acetic anhydride by the carbonylation of methyl acetate requires the use of large amounts of iodine compounds fed as hydrogen iodide or preferably lithium iodide or methyl iodide. The process of this invention provides a means for the preparation of those iodine compounds. In the practice of the invention iodine and hydrogen are reacted at a hydrogen pressure of at least 15 psig, preferably about 100 to 500 psig at a temperature between about 80° and 200 C., preferably about 100° to 150° C. The nonalcoholic, organic solvent can be selected from a wide variety of compounds liquid under the reaction conditions. However, the particular solvent will vary depending on the presence of certain compounds in the reaction mixture. Examples of solvents that may be used include $C_2$–$C_4$ carboxylic acid, lower alkyl esters of such acid and hydrocarbons such as toluene. Acetic acid is the preferred solvent due to its compatibility with the acetic anhydride process described above. Other inert liquids may also be present such as acetic anhydride which assures that the reaction medium remains anhydrous.

When the process involves only the reaction of hydrogen and iodine, the resulting hydrogen iodide is essentially insoluble in the reaction mixture and therefore the gaseous hydrogen iodide must be collected, for example, by transferring it to water or to an alcohol, and alkyl ester of a carboxylic acid or a solution of lithium acetate which converts the hydrogen iodide to an alkyl iodide or lithium iodide. For this reason it is preferred that a nonalcoholic hydrogen iodide "acceptor" such as methyl acetate and/or lithium acetate be included in the reaction medium. The presence of methyl acetate results in the formation of methyl iodide by the reaction with the former. When methyl acetate is the only hydrogen iodide acceptor used the solvent system may consist of acetic acid, methyl acetate of a hydrocarbon or a mixture thereof. However, when the acceptor is lithium acetate, which reacts with hydrogen iodide to give lithium iodide, the reaction medium must contain a solvent such as acetic acid which will dissolve both lithium salts. The amounts of the solvents that are necessary will vary considerably depending on the amount of each reactant (iodine) or co-reactant (methyl or lithium acetate) present.

The rhodium catalyst is an ionic rhodium species which forms as the result of a rhodium compound such as a rhodium halide or oxide contacting an iodine compound such as lithium iodide, methyl iodide, hydrogen iodide or iodine in the presence of carbon monoxide. By characterizing the catalyst as homogeneous is meant that the catalytic species is soluble in the reaction medium. The catalyst employed initially can be a soluble rhodium carbonyl compound such as $Rh_2(CO)_4Cl_2$ which when contacted with an iodine compound forms the catalyst. The rhodium also can be fed initially as a halide such as $RhCl_3 \cdot xH_2O$ or an oxide such as $Rh_2O_3$. When the rhodium is fed as a halide or oxide, carbon monoxide must be present during at least the start-up of the process. In the continuous operation in which methyl acetate and iodine are fed to a reactor and methyl iodide is removed, the hydrogen fed to the reactor can contain up to about 95 volume percent carbon monoxide. The iodine necessary to convert the rhodium halide or oxide to the catalytically active rhodium compound can be derived from the iodine reactant although an induction period prior to the significant reaction of iodine and hydrogen can occur. The iodine source preferably is lithium iodide fed to the reaction mixture initially in a mole ratio of about 2 to 10 moles per mole of rhodium.

The amount of catalyst employed can be varied substantially depending on such factors as the reaction pressures and temperatures used, the desired rate of reaction, etc. Generally, rhodium concentrations of about 500 to 5000 ppm will be effective to catalyze the reaction of hydrogen and iodine while concentrations of about 1000 to 2500 are preferred.

As stated hereinabove, it is preferred that the reaction of hydrogen and iodine is carried out in the presence of a hydrogen iodide acceptor such as lithium or methyl acetate. Generally, the acceptor should be present in an amount of at least two moles per mole of iodine, preferably at least about 3 moles of acceptor per mole of iodine fed. This ratio, however, can vary for example, in continuous operation of the process the amount of acceptor required will depend on the rate at which the iodine is converted to hydrogen iodide. When lithium iodide is the desired product, the weight ratio of lithium acetate (as the dihydrate) to acetic acid solvent can be in the range of about 0.001 to 0.3 depending on the reaction temperature. The preferred ratio is about 0.01 to 0.2. When only the preparation of methyl iodide is desired, the weight ratio of methyl acetate to acetic acid can be about 0.1 to 100, preferably about 4 to 10 since at the lower ratios, especially at lower temperatures, catalyst solubility can be a problem.

The invention is further illustrated by the following examples.

EXAMPLE 1

The following were charged to a 6-ounce Fischer-Porter bottle fitted with a gas inlet line and a dip-tube/valve assembly permitting the removal of liquid samples: $Rh_2(CO)_4Cl_2$, 0.19 g.; $LiOAc \cdot 2H_2O$, 20.40g.; LiI, 0.54 g.; $I_2$, 12.69 g.; HOAc, 100 mL.; $Ac_2O$, 50 mL. The vessel was sealed and purged with hydrogen by pressurizing to 40 psig then venting. The bottle was pressurized to 40 psig with hydrogen then placed in an oil bath heated to 99° C. A constant pressure of hydrogen was maintained throughout the experiment. Samples were removed periodically and analyzed for LiOAc. The graph below indicates the rate of disappearance of LiOAc and thus the production rate of hydrogen iodide. The reaction was complete in 95 minutes as evidenced by the absence of iodine.

EXAMPLE 2

The following were charged to a 3-ounce Fischer-Porter aerosol-compatability test bottle fitted with an inlet line: $Rh_2(CO)_4Cl_2$, 0.19 g.; LiI, 0.54 g.; $I_2$, 6.35 g.; HOAc, 20.0 g.; $Ac_2O$, 5.0 g.; $CH_3OAc$, 10.0 g. The vessel was sealed and purged with hydrogen by pressurizing to 40 psig then venting. The bottle was pressurized to 40 psig with hydrogen then placed in an oil bath heated to 99° C. A constant pressure (40 psig) of hydrogen was maintained throughout the experiment. After 240 minutes the vessel was cooled and the contents analyzed by gas chromatography. The product contained 2.84 g. of methyl iodide.

EXAMPLES 3-10

The reactants and solvents set forth in Table I and catalyst (all in grams) were charged to a 300 cc Hastelloy-B autoclave. After sealing, the autoclave was flushed with CO by pressurizing to 100 psig then venting slowly. The autoclave was pressurized to 10 psig with CO and heated to 160° C. The autoclave pressure was then pressurized to 500 psig with $H_2$ and agitated for 1 hour. After cooling the autoclave was vented and the product removed for analysis. In Examples 3-5 and 6-10 0.26 g. $RhCl_3 \cdot xH_2O$ and in Example 6 0.25 g. $Rh_2O_3$ was used as the catalyst. The yield of product is shown in Table I. In Example 5, the product was treated with methyl acetate which, by gas chromatographic (gc) analysis, resulted in the formation of a substantial amount of methyl iodide. In Examples 6, 7 and 8, the amount of product obtained was not determined quantitatively although gc analysis of the final reaction mixture showed the presence of a substantial amount of methyl iodide.

TABLE I

| Example | $I_2$ | LiOAc.$2H_2O$ | LiI | HOAc | $Ac_2O$ | $CH_3OAc$ | Toluene | Product | Yield |
|---|---|---|---|---|---|---|---|---|---|
| 3 | 12.69 | 20.4 | 0.54 | 75.0 | 75.0 | 0 | 0 | LiI | 86.4% |
| 4 | 12.69 | 0 | 0.54 | 75.0 | 75.0 | 14.82 | 0 | $CH_3I$ | 100% |
| 5 | 12.69 | 20.4 | 0 | 75.0 | 75.0 | 0 | 0 | LiI | 89.0% |
| 6 | 12.69 | 20.4 | 0.54 | 75.0 | 75.0 | 0 | 0 | LiI | 90.0% |
| 7 | 12.69 | 0 | 0.54 | 125.0 | 10.0 | 0 | 0 | — | — |
| 8 | 12.69 | 0 | 0.54 | 0 | 25.0 | 14.82 | 125.0 | $CH_3I$ | — |
| 9 | 12.69 | 0 | 0.54 | 0 | 0 | 14.82 | 125.0 | $CH_3I$ | — |
| 10 | 12.69 | 0 | 0.54 | 0 | 0 | 150.0 | 0 | $CH_3I$ | — |

The invention has been described in detail with particular reference to certain preferred embodiments thereof, but it will be understood that variations and modifications can be effected within the spirit and scope of the invention.

I claim:

1. Process for the preparation of hydrogen iodide which comprises reacting under anhydrous conditions hydrogen and iodine at a temperature of about 80° to 200° C. and a hydrogen pressure of at least 15 psig in a non-alcoholic, organic solvent in the presence of a homogeneous rhodium catalyst, the rhodium catalyst being the result of a rhodium compound contacting an iodine compound in the presence of carbon monoxide.

2. Process according to claim 1 wherein the solvent is acetic acid and the concentration of rhodium is about 500 to 5000 ppm.

3. Process according to claim 2 wherein hydrogen and iodine are reacted at a temperature of about 100° to 150° C. at a hydrogen pressure of about 100 to 500 psig in the presence of about 1000 to 2500 ppm rhodium and lithium acetate which reacts with the hydrogen iodide to form lithium iodide.

4. Process according to claim 2 wherein hydrogen and iodine are reacted at a temperature of about 100° to 150° C. at a hydrogen pressure of about 100 to 500 psig in the presence of about 1000 to 2500 ppm rhodium and methyl acetate which reacts with the hydrogen iodide to form methyl iodide.

* * * * *